US010341318B2

(12) United States Patent
Lapuh et al.

(10) Patent No.: US 10,341,318 B2
(45) Date of Patent: Jul. 2, 2019

(54) SKILL-BASED SECURE DYNAMIC CONTACT CENTER AGENT ACCESS

(71) Applicant: Avaya Inc., Santa Clara, CA (US)

(72) Inventors: Roger Lapuh, Uesslingen (CH); Andrew John Rufener, Den Haag (NL); William H. Jolicoeur, Cary, NC (US)

(73) Assignee: Avaya Inc., Santa Clara, CA (US)

( * ) Notice: Subject to any disclaimer, the term of this patent is extended or adjusted under 35 U.S.C. 154(b) by 62 days.

(21) Appl. No.: 14/935,320

(22) Filed: Nov. 6, 2015

(65) Prior Publication Data

US 2016/0134611 A1 May 12, 2016

Related U.S. Application Data

(60) Provisional application No. 62/076,464, filed on Nov. 6, 2014.

(51) Int. Cl.
*H04L 29/06* (2006.01)
*H04L 29/12* (2006.01)
*H04W 12/08* (2009.01)

(52) U.S. Cl.
CPC ............ *H04L 63/08* (2013.01); *H04L 63/104* (2013.01); *H04L 63/105* (2013.01); *H04L 63/20* (2013.01); *H04W 12/08* (2013.01)

(58) Field of Classification Search
CPC ..... H04L 63/08; H04L 63/105; H04L 63/104; H04L 63/20; H04W 12/08
See application file for complete search history.

(56) References Cited

U.S. PATENT DOCUMENTS 8,582,475 B1 * 11/2013 Marghescu ......... H04M 3/5183 370/270
2006/0053290 A1 * 3/2006 Randle ................. G06Q 20/027 713/169
2008/0091829 A1 * 4/2008 Spataro ................. G06F 9/4446 709/227
2009/0150984 A1 * 6/2009 Dalton, Jr. ............ H04L 63/123 726/7
2010/0172488 A1 * 7/2010 Segall ............... H04M 3/42365 379/266.07
2010/0296646 A1 * 11/2010 Hemm ................. G06Q 10/107 379/265.02
2010/0332649 A1 * 12/2010 Proulx ................ H04L 41/0816 709/224
2011/0090907 A1 * 4/2011 Coy ........................ H04L 45/38 370/392
2012/0166203 A1 * 6/2012 Fuchs ................... G06F 19/325 704/275
2012/0266258 A1 * 10/2012 Tuchman .............. H04L 63/104 726/28
2012/0290702 A1 * 11/2012 Vincent ............... G06F 9/45558 709/223
2013/0282417 A1 * 10/2013 Gaedcke .............. G06Q 30/016 705/7.13
2014/0122875 A1 * 5/2014 Pizi ....................... G06F 9/4445 713/164

* cited by examiner

*Primary Examiner* — Mohammad A Siddiqi

(57) ABSTRACT

Methods, systems and computer readable media for providing skill-based, secure and dynamic contact center agent network access are described.

19 Claims, 9 Drawing Sheets

SDN CONTROLLER AND/OR SDCCA LOGIC OBTAINS CONFIGURATION FROM CC ENVIRONMENT — 302
DEVICE (E.G., PHONE OR PC) LOGON BY AGENT — 304
EAP/IDE BASED POLICY CONFIGURATION TO SKILL-BASED VSN — 306
AGENT PLACED IN SKILL-BASED VSN — 308
AGENT IS GIVEN ACCESS TO NETWORK RESOURCES ASSOCIATED WITH SKILL-BASED VSN — 310

= INFORMATION FROM CC AND CC OPERATOR CONFIGURED

= DERIVED INFORMATION

SKILL-BASED SECURE DYNAMIC CONTACT CENTER AGENT ACCESS

RELATED APPLICATIONS

This application claims the benefit of U.S. Provisional Application No. 62/076,464, entitled "Skill-Based Secure Dynamic Contact Center Agent Access", filed on Nov. 6, 2014, which is incorporated herein by reference in its entirety.

TECHNICAL FIELD

Embodiments relate generally to computer networks, and more particularly, to methods, systems and computer readable media for providing skill-based, secure and dynamic contact center agent network access.

BACKGROUND

For contact center outsourcers, who may serve multiple customers, ensuring data privacy when employing contact center skills-based routing, which optimizes for agent efficiency and flexibility can be challenging. While customer service representatives may require access to certain customer data to fulfill callers' requests, this can result in rigid data infrastructure deployments that require dedicated agent skill assignments instead of the flexible skill assignments typical of some non-outsourced contact centers.

In contact center environments, contact center operators often access client business applications in order to provide the services required. In some cases, these business applications have not been developed with an outsourced operating model in mind and thus in many cases placing the added burden on contact center operators to secure the access to these applications.

For contact center outsourcing operators, especially larger ones, this can lead to significantly increased network complexity requiring them to place and operate additional firewalls in their infrastructure. However, in many cases, the additional firewalls do not solve the access problem as operators limit connectivity between devices rather than by client assigned agent and accessed resource.

Some conventional solutions may operate at two separate and independent levels, namely telephony/contact center and network. The network level is a simple transport infrastructure that has no knowledge of the rules defined and enforced in the contact center environment. Some of the conventional solutions may require network operators (e.g. human operators) to understand both domains and to manually link the domains. However, without the dynamic understanding of which agent has logged onto which workstation and phone and has been assigned to which client, the infrastructure level security may be inadequate and inefficient.

Embodiments were conceived in light of the above mentioned needs, problems and/or limitations, among other things.

SUMMARY

One or more embodiments can include methods, systems and computer readable media for providing skill-based, secure and dynamic contact center agent network access. In some implementations, the method can include obtaining configuration information from a call center environment and detecting an authenticated agent logon of an agent from an agent device. The method can also include retrieving agent skill information from skill group information, and determining, based on the agent skill information, one or more secure virtual service networks to permit the agent device to access. The method can further include permitting the agent device (e.g., desktop client or browser, mobile device, etc.) to access the one or more secure virtual service networks.

Some implementations can include a system comprising one or more processors configured to perform operations. The operations can include obtaining configuration information from a call center environment, and detecting an authenticated agent logon of an agent from an agent device. The operations can also include retrieving agent skill information, and determining, based on the agent skill information, one or more secure virtual service networks to permit the agent device to access. The operations can further include providing access to the agent via the agent device to the one or more secure virtual service networks.

Some implementations can include a nontransitory computer readable medium having stored thereon software instructions that, when executed by one or more processors, cause the one or more processors to perform operations. The operations can include obtaining configuration information from a call center environment, and detecting an authenticated agent logon of an agent from an agent device. The operations can also include retrieving skill information about the agent, and determining, based on the agent skill information, one or more secure virtual service networks within a virtualized network system to permit the agent device to access. The operations can further include providing access to the agent via the agent device to the one or more secure virtual service networks.

The following apply to any of the above mentioned implementations. The configuration information can include one or more of customer identifiers, one or more call directory numbers, one or more call flows, one or more skills, one or more agents associated with the skills, and one or more service instance identifiers (ISIDs) each associated with a respective customer identifier, each ISID configured to identify VLAN/VRF traffic across a virtualized network infrastructure. The agent skill information can be associated with a customer corresponding to the one or more secure virtual service networks. Determining the one or more secure virtual service networks can include mapping one or more policies to one or more skills in the agent skill information. Detecting the authenticated agent logon includes receiving authentication information via an IDE/EAP protocol.

Providing access can include providing access to a virtual service network associated with a service instance identifier corresponding to a customer associated with one or more skills in the agent skill information. The virtual service networks can be part of a virtualized network system that includes a shortest path bridging network. The virtual service networks can be part of a virtualized network system that includes a shortest path bridging mac-in-mac network.

DETAILED DESCRIPTION

In general, some implementations can permit skill based routing information in the contact center system environment to form the basis for skill based access at the networking level.

Some implementations can link information available in the contact center environment with the network and dynamically and securely allocate only the needed network resources to the call center agent upon agent login. For example, some implementations can include a secure dynamic contact center agent (SDCCA) controller having control logic that is configured to determine a contact center configuration. The contact center configuration can include configuration information such as call directory numbers (CDNs) or vector directory numbers, call flows (or vectors), Agent Skills, Agent Identifiers (IDs), Customer IDs, and information related to assigned network resources, such as one or more Backbone Service Instance Identifiers (ISIDs) and their respective mapping to the contact center client and/or client resources. From the configuration information, the SDCCA controller can derive a dynamic and secure network configuration. The dynamic and secure network configuration can be based on the concept of pooling all agents with the same skills (and likely client assignments) into a single secure network domain and dynamically and securely enabling access for that domain to only the required (or needed) network resources based on the skill assignment. The dynamic aspect includes the ability of the SDCCA controller to provision network access based on one or more contact center clients and the network resources associated with each respective client. The secure aspect includes the ability for the SDCCA to permit an agent to access provisioned network resources based on one or more skill groups the agent may be a member of. The skill groups may be associated with one or more clients and/or one or more skills required by a client.

For example, the SDCCA controller can provision a network Lightweight Directory Access Protocol (LDAP) based access control system that end points use for authentication via the Extensible Authentication Protocol (EAP). The SDCCA controller can also ensure provisioning of Virtual Service Networks (VSNs) and Virtual Routing and Forwarding (VRF) functions are secured through the application of Intermediate System-Intermediate System (IS-IS) accept policies or alternatively an external firewall.

By dynamically linking the secure provisioning of network resources to the skill information in the contact center system true and dynamic secure access can be guaranteed (or better ensured) based on a single and relevant source of skill information. This can result in significantly reduced operational cost and complexity for outsourced contact center operators, as well as significantly improved data security and more flexible business models compared to conventional outsourced call center environments and architectures.

Figure 1:
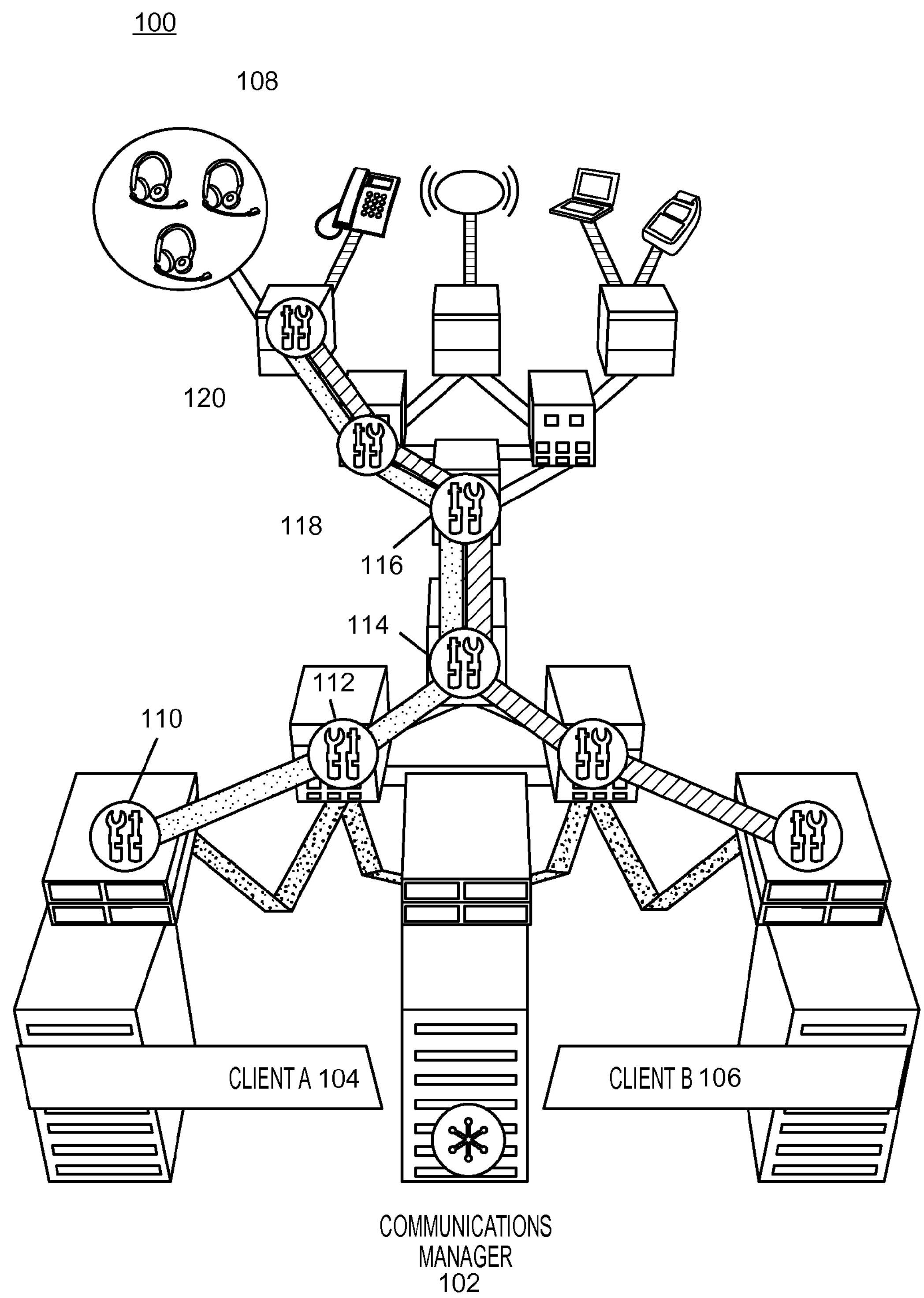
FIG. 1 is a diagram of an example conventional outsourcing contact center architecture.

FIG. 1 is a diagram of an example conventional outsourcing contact center architecture 100. In particular, the conventional architecture 100 can include a communications manager 102, a first client 104 (e.g., Client A), a second client 106 (e.g., Client B), and a plurality of contact center agent systems 108. The architecture 100 also includes a plurality of network configuration points 110-120 disposed between the clients and the contact center agent systems. These configuration points may require manual configuration and may not have access to the contact center business logic contained within the communications manager 102.

As mentioned above, the conventional architectures (such as that shown in FIG. 1) can have a network level that is a simple transport infrastructure having no knowledge of the rules defined and enforced in the contact center environment. The conventional architecture 100 may require network operators (e.g. human operators) to understand both the network transport domain and the contact center business rules and/or logic and manually configure and link the domains. This conventional arrangement may suffer from one or more limitations relative to an implementation of the system described herein. For example, some conventional architectures may offer little or no dynamic linkage between network and contact center (CC) logic. Some conventional architectures may have complex overlay and firewall structures that may be manually translated from CC logic. These overlay and firewall structures may have high complexity and be prone to human error, may have relatively high operational expenditure (OpEx), and may require a relatively long time to service (e.g., potentially months for complex client solutions. As discussed below, some implementations of the disclosed subject matter may overcome the problems and limitations of some conventional architectures mentioned above and shown in FIG. 1.

Figure 2:
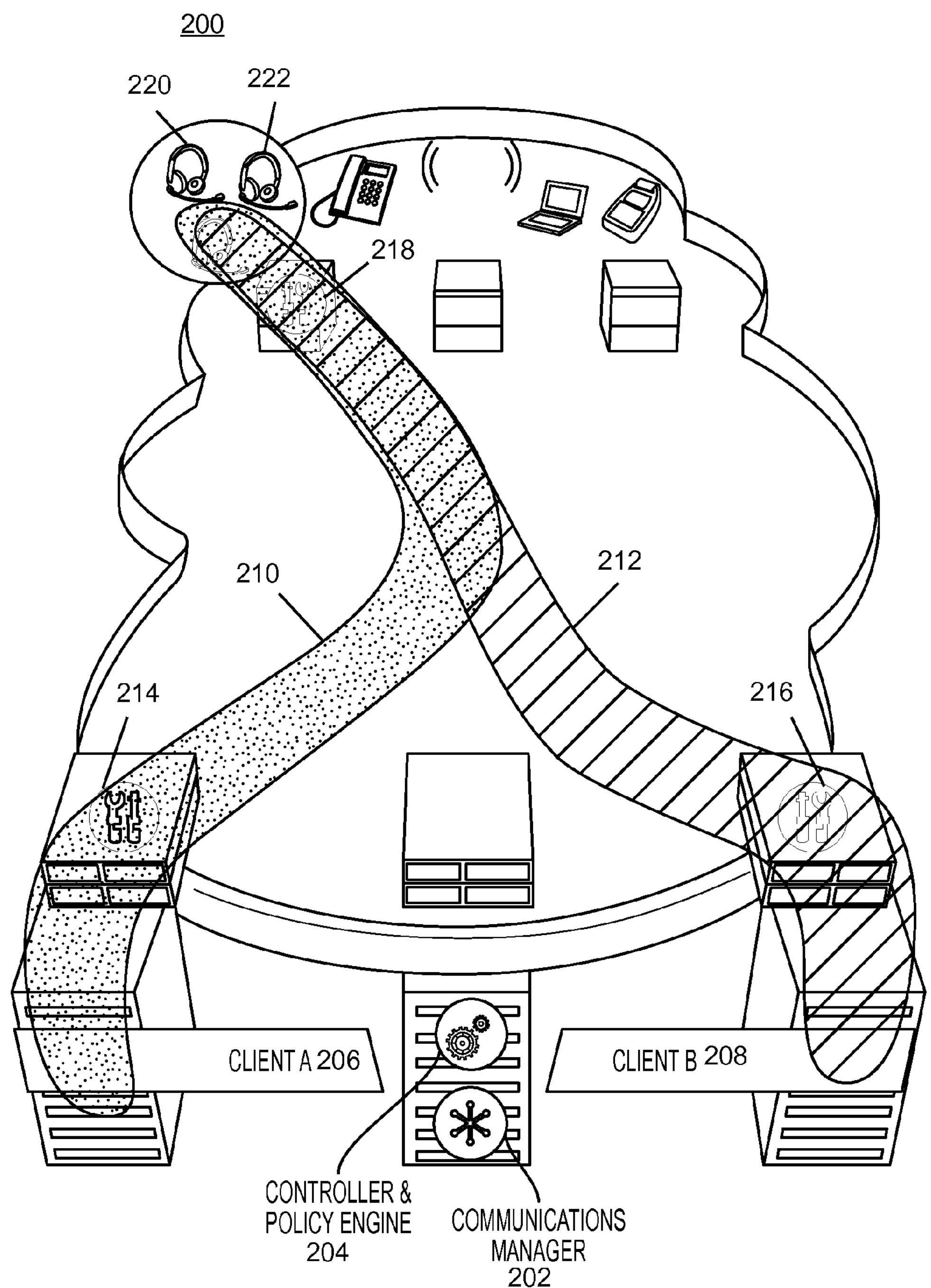
FIG. 2 is a diagram of an example outsourcing contact center architecture in accordance with at least one implementation.

FIG. 2 is a diagram of an example outsourcing contact center architecture 200 in accordance with at least one implementation. The example outsourcing contact center architecture 200 includes a virtualized network 201 (e.g., a shortest path bridging (SPB) network, a shortest path bridging with mac-in-mac encapsulation (SPBm) network, or the like). An example of a virtualized network solution is the Fabric Connect architecture made by Avaya, Inc.

The example outsourcing contact center architecture 200 also includes a communications manager 202, an SDCCA controller and policy engine 204, a first client 206 (e.g., Client A), a second client 208 (e.g., Client B), a first virtual service network (VSN) 210, a second virtual service network (VSN) 212, automatically configured network resources 214-218, and a plurality of contact center agent systems 220-222.

The first VSN 210 is associated with Client A and includes access to network resources of Client A. The second VSN 212 is associated with Client B and includes access to network resources of Client B. Each VSN can be an L2 VSN (or VLAN) or an L3 VSN (or VRF). An L2 VSN bridges customer VLANs (C-VLANs) over the SPBM core (or virtualized network) infrastructure. An L3 VSN provides IP connectivity over SPBM for VRFs. The VSNs can also include a virtual private network (VPN).

The SDCCA controller 204 determines the configuration of the call center based on one or more of CDNs, call flows, agent skills, agent IDs, customer IDs, and information related to assigned network resources, such as one or more service instance identifiers (ISIDs), which are used to identify VLAN/VRF traffic across a virtualized network infrastructure (e.g., across an SPBm backbone), and mapping of ISIDs to contact center clients and/or client resources. In some implementations, the configuration can include one or more virtualization domain identifiers (or virtual private network (VPN) identifiers) instead of or in addition to the one or more ISIDs. Further, some implementations can include multiprotocol label switching (MPLS) and use MPLS labels as service identifiers in place of ISIDs. When a call center agent logs onto the system, the SDCCA controller can connect the agent with one or more VSNs based on the skill set(s) of the agent. Skills can be identified by a skill identifier. Skills can include skills for which the agent has demonstrated proficiency, skills for which the agent has received satisfactory customer reviews, skills for which the agent has completed training in, skills that are associated with a client the agent has been trained for, etc. Skills can include tasks, task types, skills, skill types, spoken languages, licenses (e.g., a license to sell insurance, etc.), and certain domain knowledge (e.g., health insurance but not auto insurance), etc.

As discussed below in connection with FIG. 9, customers (or clients) of the call center are associated with call directory numbers, which can include extensions on an automatic call distributor that directs an incoming call to a call flow. A call flow can include a user-defined sequence of actions that are taken in response to receiving a call from a given CDN. Each call flow (or vector) can be associated with one or more skills, which can be associated with a skill group that identifies agents having one or more of the skills in the skill group. Accordingly, a customer can be associated with an ISID corresponding to a VSN and one or more CDNs and corresponding call flows. Each agent can be associated with a skill group that is associated with one or more call flows. When an agent logs on to the call center system, the SDCCA can determine the skill group(s) the agent belongs to and securely connect the agent to the network resources (e.g., VSNs) corresponding to those skill groups. Because the disclosed call center architecture includes a virtualized network architecture, the network resources can be dynamically provisioned without the often costly and time consuming manual configuration associated with some conventional call center architectures.

By connecting the agent to the VSN(s) associated with one or more of the skill groups the agent belongs to, the agent is able to access only those network resources associated with the one or more VSNs the agent has access to. Further, because the network transport layer is a virtualized network with VSNs, the issues of configuring and maintaining complex firewalls, overlays, etc. are reduced or eliminated.

As will be apparent from the present disclosure, combining network virtualization (e.g., 201) with skill based network resource access under control of an SDCCA controller (e.g., 204) can provide several advantages over conventional call center architectures. For example, in the network virtualization example implementation shown in FIG. 2, business logic can remain in the CC, while the SDCCA controller provisions virtual network services and policy engine based CC logic dynamically and on an as needed basis. Security for this system can now be agent-based rather than site/device based. Also, an implementation may have relatively low operational expenditures due to automation and high availability due to simplification. Further, a virtualized network/agent skill-based access implementation can provide a relatively short time to service without disruption of other tenants/clients.

Figure 3:
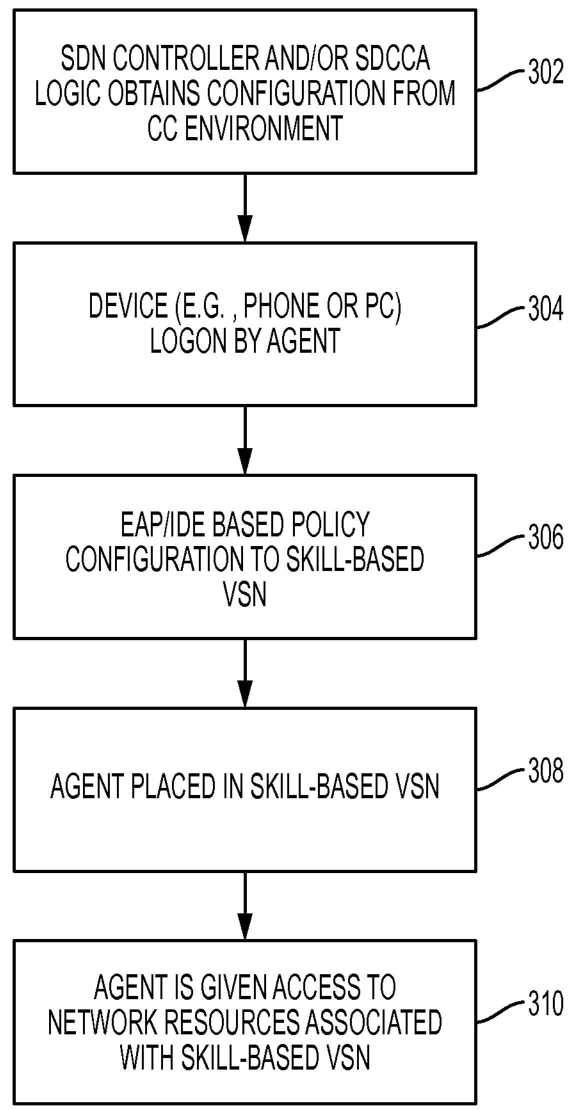
FIG. 3 is a flow chart of an example method for providing skill-based, secure and dynamic contact center agent network access in accordance with at least one implementation.

FIG. 3 is a flow chart of an example method for providing skill-based, secure and dynamic contact center agent network access in accordance with at least one implementation. Processing begins at 302, where a controller (e.g., software defined network controller or SDCCA controller) obtains configuration information (similar to that discussed above) from the CC environment. During this process, for example, the controller can provision an IDE (LDAP), create respective ISIDs and provision one or more VRFs IS-IS accept policies) and/or VLANs. Processing continues to 304.

At 304, the system detects an agent logon from an agent device (e.g., a phone, computer or the like). As part of an authentication process for agents, each agent may be required to provide an agent ID that can be used to lookup skills or skill groups that the agent is associated with. Processing continues to 306.

At 306, one or more skill-based VSNs are determined for the agent based on policy information (e.g., EAP/IDE based policy configuration). The EAP/IDE based policy configuration to skill-based VSN mapping can be performed by an SDCCA controller (e.g., 204). Processing continues to 308.

At 308, the agent (via agent device, e.g., 220, 222) can be connected to and permitted access to one or more respective VSNs (e.g., 210 and/or 212) based on the agent skills (or other profile information). For example, the agent may be determined to have one or more skills which can be included in the agent profile. The SDCCA controller can determine one or more skill groups based on identified agent skills and add agents to lists within skill groups for which the agent has the corresponding skill. The skill groups can be associated with one or more VSNs. Thus, by being a member of a skill group, an agent can be permitted access to the one or more VSNs associated with that skill group. Processing continues to 310.

Figure 6:
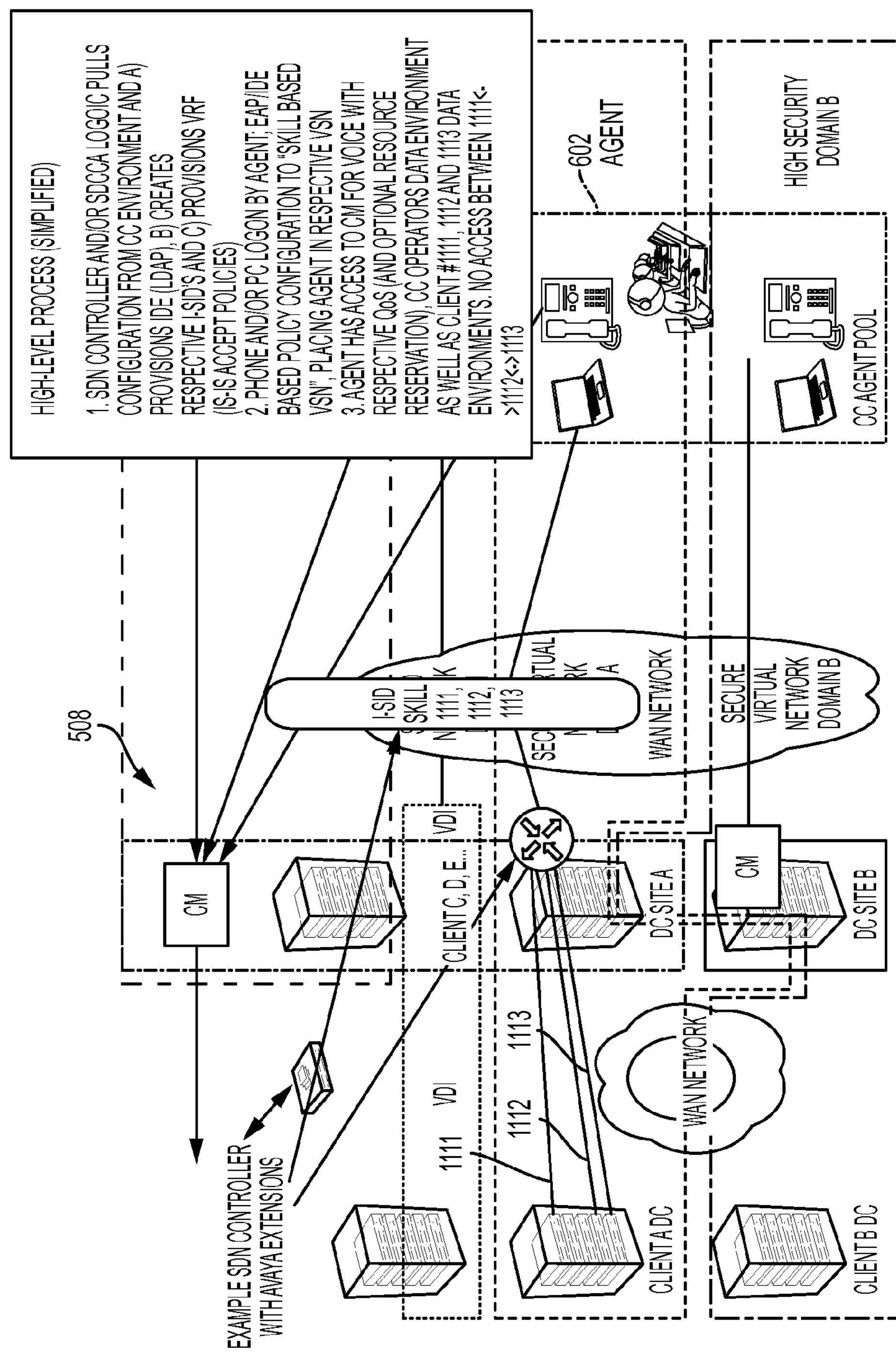
FIG. 6 is a diagram of an example outsourcing contact center architecture in accordance with at least one implementation.

At 310, agent is given access to network resources corresponding to the skill-based VSN in which the agent was placed. Each VSN can be connected to network resources (e.g., data, applications, or the like) associated with a call center client. For example, as shown in FIG. 6, an agent may log on to access a communication management system (e.g., Avaya CM) for voice with respective QoS (and optional resource reservation) and CC agents' data environment. The agent may also have access provided for one or more client data environments (e.g., 1111, 1112 and/or 1113) based on the VSN(s) that the agent is connected to. As part of the security features of an implementations, there may be no access between data environments 1111, 1112, and 1113.

Figure 4:
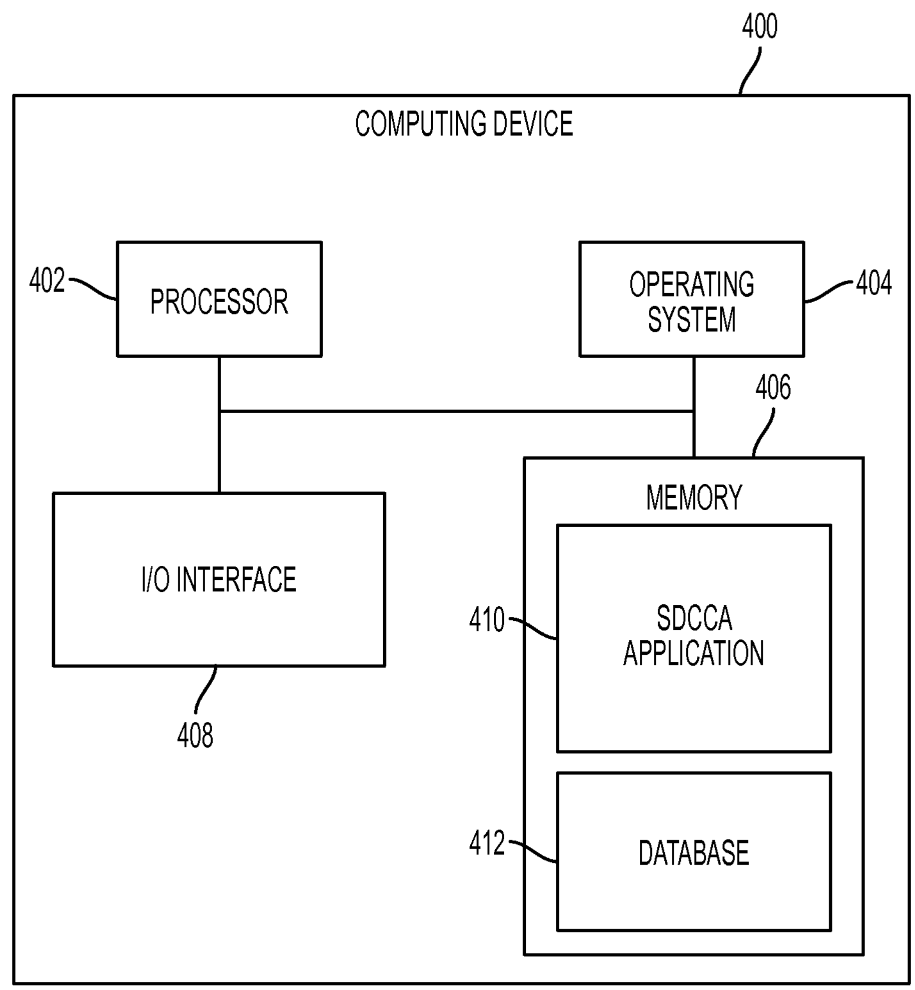
FIG. 4 is a diagram of an example computer system for wireless device location using micro-location data in accordance with at least one implementation.

FIG. 4 is a diagram of an example computing device 400 in accordance with at least one implementation. The computing device 400 includes a processor 402, operating system 404, memory 406 and I/O interface 408. The memory 406 can include an application for providing skill-based, secure and dynamic contact center agent network access 410 and a database 412 (e.g., for storing agent skills, network information, customer information or the like).

In operation, the processor 402 may execute the application 410 stored in the memory 406. The application 410 can include software instructions that, when executed by the processor, cause the processor to perform operations for providing skill-based, secure and dynamic contact center agent network access in accordance with the present disclosure (e.g., performing one or more of steps 302-310 described above). The application 410 can operate in conjunction with the database 412 and the operating system 404. The computing device 400 can be part of a standalone system (e.g., a computer system, a server, or the like) or may be part of a network device such as a bridge, router, access point, or the like.

Figure 5:
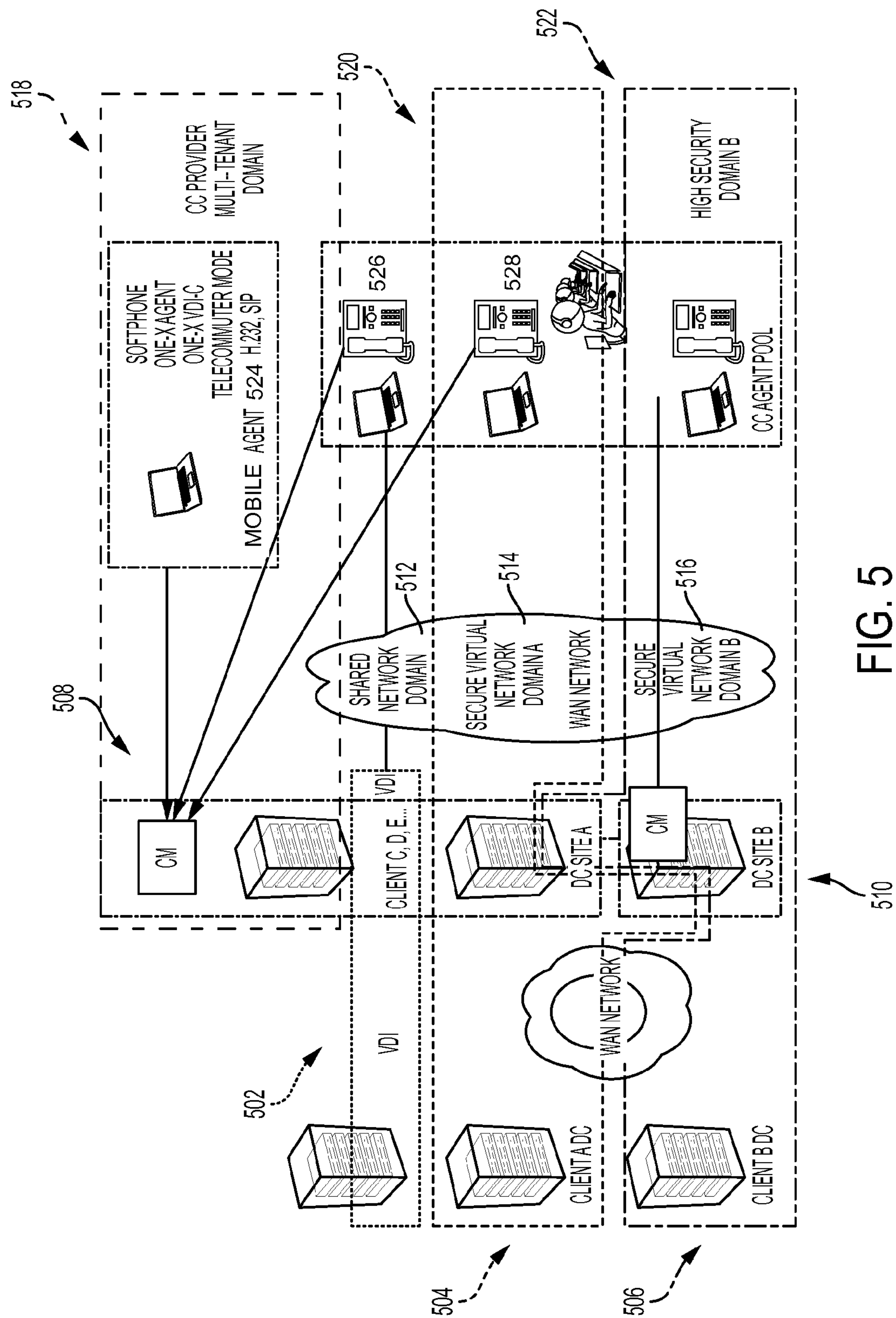
FIG. 5 is a diagram of an example outsourcing contact center architecture in accordance with at least one implementation.

FIG. 5 is a diagram of an example outsourcing contact center architecture in accordance with at least one implementation. In particular, the architecture includes a virtual desktop infrastructure 502, a first data center 504 (Client A DC), a second data center 506 (Client B DC), a first communications manager group 508 (for servicing clients C, D, E, etc.), a second communications manager group 510 (for client B), a shared network domain 512, a secure virtual network domain (e.g., WAN network) 514, a second secure virtual network domain B 516, a call center provider multi-tenant domain 518, a first secure call center domain 520, a second secure (e.g., high security) call center domain 522.

In operation, a SDCCA controller may detect an authentication or log on from one or more agents and connect the agents with virtual service networks and network resources based on one or more skill groups the agent belongs to. For example, the mobile agent 524 may have a skill associated with a first skill group that is associated with one or more of Clients C, D and E. The SDCCA controller can then connect the mobile agent to a virtual service network within the shared network domain 512. A second agent 526 may have a skill similar to one of the skills of the mobile agent 524 and may also be connected to the virtual service network within the shared network domain 512.

A third agent 528 may have a skill associated with Client A and may be connected to a virtual service network within the secure virtual network domain A 514 corresponding to Client and resources within the data center of Client A 504.

FIG. 6 is a diagram of an example outsourcing contact center architecture in accordance with at least one implementation. In this example, a software defined network controller can be controlled by an SDCCA to establish three skill-based ISIDs (1111, 1112 and 1113) that correspond to virtual service networks associated with a respective skill (or skill group). When an agent 602 is authenticated to the system (e.g., logs on), the skill groups the agent 602 belongs to can be determined and the agent 602 can be provided network access based on skills according the method described above in connection with FIG. 3. For example, based on the determined skills of agent 602, the agent device of agent 602 may be given access to one or more of the virtual service networks associated with ISIDs 1111, 1112, and 1113.

Figure 7:
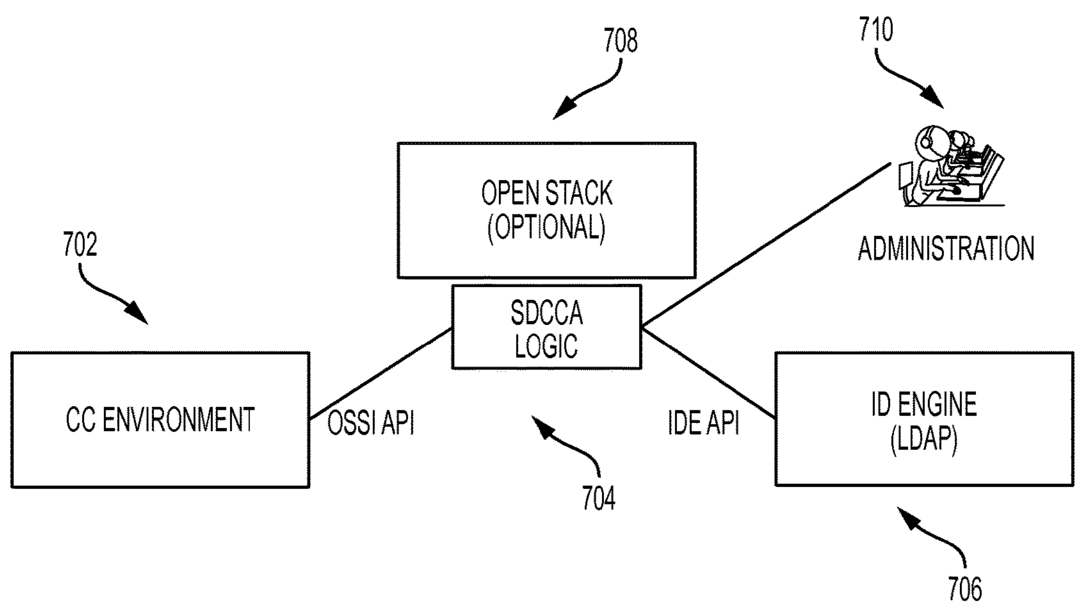
FIG. 7 is a high-level diagram of an example outsourcing contact center architecture in accordance with at least one implementation.

FIG. 7 is a high-level diagram of an example outsourcing contact center architecture 700 in accordance with at least one implementation. The architecture 700 can include a call center environment 702 coupled to SDCCA logic 704 via, for example, an OSSI API. The SDCCA logic 704 can operate on a software defined network including a shortest path bridging network and an optional open stack 708. The SDCCA logic 704 is coupled to an administration system 710 and an identification system (e.g., Avaya ID engine) via, for example, an IDE API. The ID engine 706 can include support for LDAP.

In operation, the SDCCA logic 704 can be configured to perform operations (e.g., one or more of steps 302-310) for secure dynamic call center access as described herein.

Figure 8:
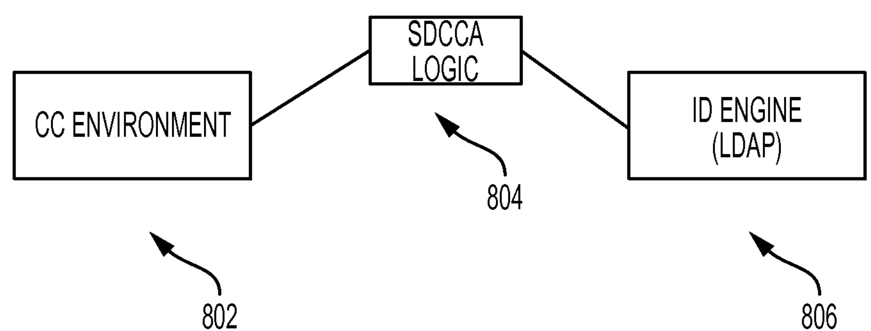
FIG. 8 is a high-level diagram of an example outsourcing contact center architecture in accordance with at least one implementation.

FIG. 8 is a high-level diagram of an example outsourcing contact center architecture 800 in accordance with at least one implementation. A call center environment 802 is coupled to SDCCA logic 804 (e.g., an SDCCA controller), which, in turn, is coupled to an ID Engine 806. In operation, the SDCCA logic 804 can be configured to perform operations (e.g., one or more of steps 302-310) for secure dynamic call center access as described herein.

It will be appreciated that the SDCCA controller, the call center environment, and the ID engine can each be separate systems or one or more of the above can be integrated into one or more integrated systems.

Figure 9:
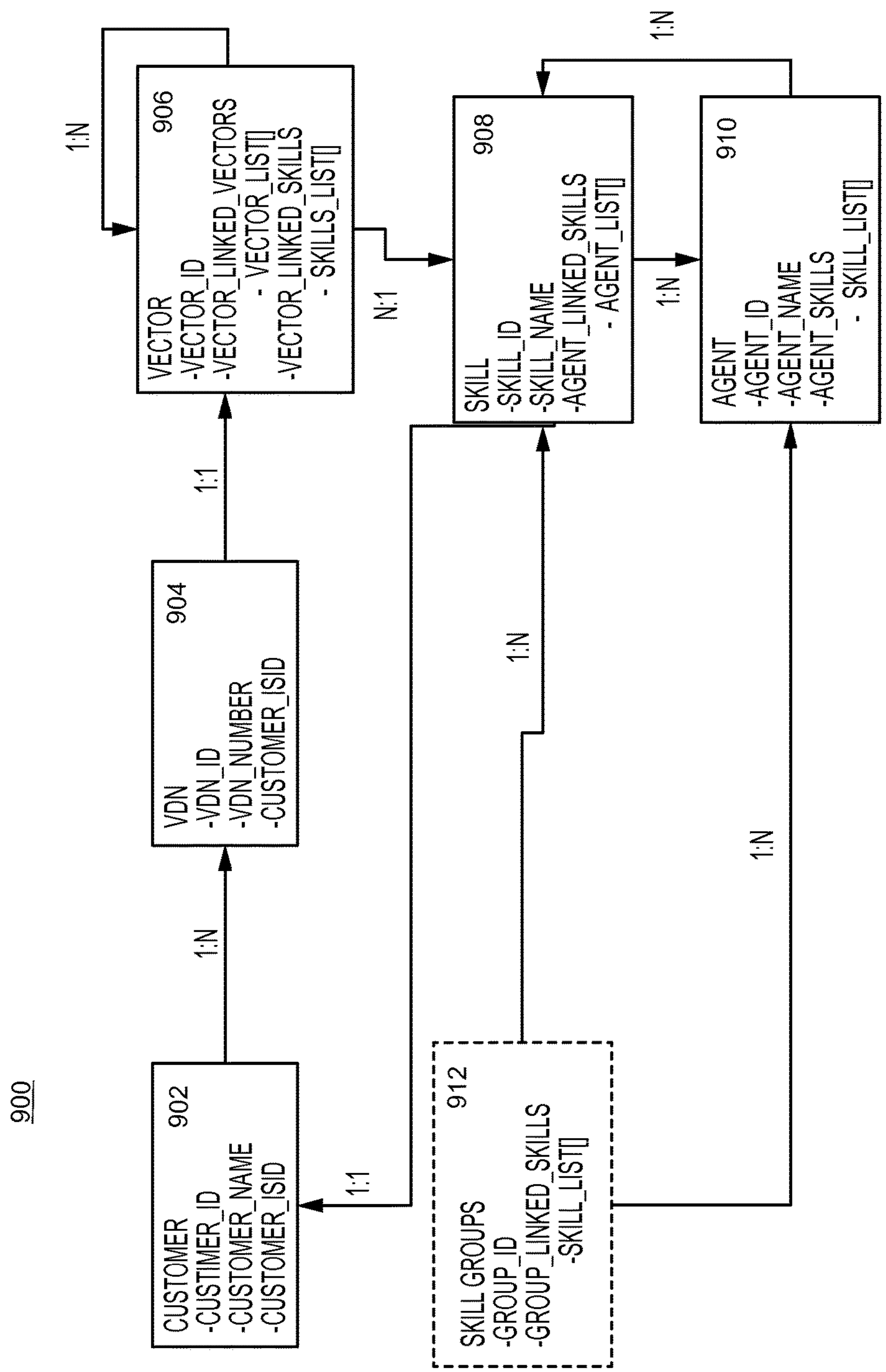
FIG. 9 is a high-level diagram of an example outsourcing contact center data model in accordance with at least one implementation.

FIG. 9 is a high-level diagram of an example outsourcing contact center data model 900 in accordance with at least one implementation. The data model 900 shows information provided from the call center in 902-910 and SDCCA derived information in 912. In FIG. 9, a vector directory number can include a call directory number and a vector can include a call flow.

The data model 900 includes customer data 902, which can include information such as customer ID, customer name and customer ISID. The customer ISID can for part of the Vector Directory Number (or call directory number) data 904, which also includes information such as a vector directory number ID, a vector directory number (VDN), and a customer ISID.

Vector data 906 can include information such as a vector ID, a vector list (e.g., a list of vector IDs, as a vector can include references to other vectors) and a list of skills (e.g., a list of skill IDs) associated with the vector. Each vector is associated with a VDN.

Skill data 908 can include information such as skill ID, skill name and a list of one or more agent skills that are associated with the skill ID. Agent data 910 can include an agent ID, agent name and a list of agent skills.

An SDCCA system can derive skill groups 912 from the skill data 908 and agent data 910. Skill group data 912 can include a skill group ID, a list of linked skills and a list of agents having one or more of those linked skills.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to, ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for providing skill-based, secure and dynamic contact center agent network access.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:

providing a virtualized network infrastructure, wherein the virtualized network infrastructure comprises a plurality of virtual service networks;

assigning a service instance identifier (ISID) to each of a plurality of skills, wherein each of the ISIDs corresponds to a respective one or more of the plurality of virtual service networks and effective to identify VLAN/VRF traffic across the virtualized network infrastructure;

obtaining, at a processor, configuration information of a call center, wherein the configuration information includes one or more service instance identifiers (ISIDs) each associated with a respective skill, wherein each ISID corresponds to a secure virtual service network associated with the respective skill;

detecting, at the processor, an authenticated agent logon of an agent from an agent device, wherein the authenticated agent logon is a logon to the call center;

retrieving, at the processor, agent skill information from skill group information, wherein the agent skill information corresponds to the agent;

determining, at the processor, based on the agent skill information, one or more secure virtual service networks to permit the agent device to access, wherein the one or more secure virtual service networks are associated with a respective customer identifier and one or more of the ISIDs, wherein the ISID associated with each of the one or more secure virtual service networks that the agent device is permitted to access corresponds to a skill that matches the agent skill information; and connecting, at the processor, the agent device to access the one or more secure virtual service networks associated with the respective customer identifier using one or more of the ISIDs corresponding to one or more skills matching the agent skill information.

2. The method of claim 1, wherein the agent skill information is associated with a customer corresponding to the one or more secure virtual service networks.

3. The method of claim 1, wherein determining the one or more secure virtual service networks includes mapping one or more policies to one or more skills in the agent skill information.

4. The method of claim 1, wherein detecting the authenticated agent logon includes receiving authentication information via an IDE/EAP protocol.

5. The method of claim 1, wherein providing access includes providing access to the virtual service network associated with the service instance identifier corresponding to a customer associated with one or more skills in the agent skill information.

6. The method of claim 1, wherein the skill group information includes skill types, spoken languages, licenses, domain knowledge, and combinations thereof.

7. The method of claim 1, wherein the connecting the agent device comprises permitting the agent device to access only network resources associated with the one or more secure virtual service networks that the agent device is permitted to access.

8. A system comprising one or more processors configured to perform operations including:

providing a virtualized network infrastructure, wherein the virtualized network infrastructure comprises a plurality of virtual service networks;

assigning a service instance identifier (ISID) to each of a plurality of skills, wherein each of the ISIDs corresponds to a respective one or more of the plurality of virtual service networks and effective to identify VLAN/VRF traffic across the virtualized network infrastructure;

obtaining, at a processor, configuration information of a call center, wherein the configuration information includes one or more service instance identifiers (ISIDs) each associated with a respective skill, wherein each ISID corresponds to a secure virtual service network associated with the respective skill;

detecting an authenticated agent logon of an agent from an agent device, wherein the authenticated agent logon is a logon to the call center;

retrieving agent skill information, wherein the agent skill information corresponds to the agent;

determining, based on the agent skill information, one or more secure virtual service networks to permit the agent device to access, wherein the one or more secure virtual service networks are associated with a respective customer identifier and one or more of the ISIDs, wherein the ISID associated with each of the one or more secure virtual service networks that the agent device is permitted to access corresponds to a skill that matches the agent skill information; and connecting, at the processor, the agent device to access the one or more secure virtual service networks associated with the respective customer identifier using one or more of the ISIDs corresponding to one or more skills matching the agent skill information.

9. The system of claim 8, wherein the agent skill information is associated with a customer corresponding to the one or more secure virtual service networks.

10. The system of claim 8, wherein determining the one or more secure virtual service networks includes mapping one or more policies to one or more skills in the agent skill information.

11. The system of claim 8, wherein detecting the authenticated agent logon includes receiving authentication information via an IDE/EAP protocol.

12. The system of claim 8, wherein providing access includes providing access to the virtual service network associated with the service instance identifier corresponding to a customer associated with one or more skills in the agent skill information.

13. A nontransitory computer readable medium having stored thereon software instructions that, when executed by one or more processors, cause the one or more processors to perform operations including:

providing a virtualized network infrastructure, wherein the virtualized network infrastructure comprises a plurality of virtual service networks;

assigning a service instance identifier (ISID) to each of a plurality of skills, wherein each of the ISIDs corresponds to a respective one or more of the plurality of virtual service networks and effective to identify VLAN/VRF traffic across the virtualized network infrastructure;

obtaining, at a processor, configuration information of a call center, wherein the configuration information includes one or more service instance identifiers (ISIDs) each associated with a respective skill, wherein each ISID corresponds to a secure virtual service network associated with the respective skill;

detecting an authenticated agent logon of an agent from an agent device, wherein the authenticated agent logon is a logon to the call center;

retrieving agent skill information, wherein the agent skill information corresponds to the agent;

determining, based on the agent skill information, one or more secure virtual service networks within a virtualized network system to permit the agent device to access, wherein the one or more secure virtual service networks are associated with a respective customer identifier and one or more of the ISIDs, wherein the ISID associated with each of the one or more secure virtual service networks that the agent device is permitted to access corresponds to a skill that matches the agent skill information; and connecting, at the processor, the agent device to access the one or more secure virtual service networks associated with the respective customer identifier using one or more of the ISIDs corresponding to one or more skills matching the agent skill information.

14. The nontransitory computer readable medium of claim 13, wherein the agent skill information is associated with a customer corresponding to the one or more secure virtual service networks.

15. The nontransitory computer readable medium of claim 13, wherein determining the one or more secure virtual service networks includes mapping one or more policies to one or more skills in the agent skill information.

16. The nontransitory computer readable medium of claim 13, wherein detecting the authenticated agent logon includes receiving authentication information via an IDE/EAP protocol.

17. The nontransitory computer readable medium of claim 13, wherein providing access includes providing access to the virtual service network associated with the service instance identifier corresponding to a customer associated with one or more skills in the agent skill information.

18. The nontransitory computer readable medium of claim 13, wherein the virtualized network system includes a shortest path bridging network.

19. The nontransitory computer readable medium of claim 13, wherein the virtualized network system includes a shortest path bridging mac-in-mac network.

* * * * *